United States Patent [19]

Daugherty et al.

[11] Patent Number: 5,381,405
[45] Date of Patent: Jan. 10, 1995

[54] COMMUNICATIONS ACCESS NETWORK ROUTING

[75] Inventors: Thomas H. Daugherty, Succasunna, N.J.; Dennis L. DeBruler, Downers Grove, Ill.; Daniel S. Greenberg, Parsippany-Troy Hills, N.J.; David J. Hodgdon, Parsippany-Troy Hills Twp., Morris County, N.J.; Douglas J. Murphy, Middletown, N.J.

[73] Assignee: AT&T Corp., Murray Hill, N.J.

[21] Appl. No.: 113,481

[22] Filed: Aug. 27, 1993

Related U.S. Application Data

[63] Continuation-in-part of Ser. No. 33,477, Mar. 18, 1993, abandoned.

[51] Int. Cl.⁶ .................. H04Q 11/04; H04M 3/42
[52] U.S. Cl. .................................... 370/54; 370/58.3; 370/60.1; 370/68.1; 370/110.2; 340/826; 379/252; 379/269; 379/272
[58] Field of Search ............... 370/16, 54, 58.1, 58.2, 370/58.3, 60, 60.1, 61, 68.1, 77, 85.13, 94.1, 94.3, 95.1, 110.1, 110.2, 55, 56; 379/219, 220, 221, 229, 230, 231, 234, 242, 245, 246, 248, 258, 268, 271, 272, 273, 280, 290, 291, 269, 251, 252, 256, 333, 334, 335; 340/825.03, 826, 827, 825.06, 825.79, 825.8

[56] References Cited

U.S. PATENT DOCUMENTS

| | | | |
|---|---|---|---|
| 4,479,196 | 10/1984 | Ferrer et al. | 364/900 |
| 4,646,229 | 2/1987 | Boyle | 364/200 |
| 4,751,697 | 6/1988 | Hunter et al. | 370/60 |
| 4,821,259 | 4/1989 | DeBruler et al. | 370/60 |
| 5,014,266 | 5/1991 | Bales et al. | 370/60.1 |

OTHER PUBLICATIONS

Bellcore Technical Reference TR-NWT-000303, Issue 2, Dec. 1992, "Integrated Digital Loop Carrier System Generic Requirements, Objectives, and Interface."
Bellcore Technical Reference, TR-TSY-000008, Issue 2, Aug. 1987, "Digital Interface Between the SLC96 Digital Loop Carrier System and a Local Digital Switch."
ETSI Work Item No: DE/SPS-3003.2, Version: 7, Apr. 28, 1993, "Signalling Protocols and Switching V interfaces at the digital Local Exchange (LE) V5.2 interface for the support of Access Network (AN)."

Primary Examiner—Alpus Hsu
Attorney, Agent, or Firm—Ronald D. Slusky

[57] ABSTRACT

A communications switch communicates a message to a particular access network endpoint by forwarding an identification of that endpoint along with the message, link-by-link, through the access network, the forwarding being accomplished by using previously stored routing information identifying, at the switch and at each cross-connection point, a particular downstream link over which the endpoint can ultimately be reached. The links connecting the cross-connection points am time-division-multiplexed links supporting digital loop carrier and fiber-in-the-loop communications. The routing information is generated and stored automatically by having each network element report information about itself upstream into the network.

24 Claims, 5 Drawing Sheets

<u>COSMOS</u> ⇒ OE: TN: F1 PAIR: CONDITION

<u>LFACS</u> ⇒ F1 PAIR: F2 PAIR: F3 PAIR...: CONDITION

<u>PREMIS</u> ⇒ STREET ADDRESS: DROP PAIR(S): SERVING TERMINAL: TN(S): OE(S): CONDITION(S)

CROSS CONNECTION TABLE
(IN PRIOR ART RT)

| FEEDER | TIMESLOTS DISTR. |
|---|---|
| ..... | ..... |
| TS46 | TS66 |
| ... | ... |

$\widehat{OE_i}$ IDENTIFIER FORMAT

| $ID_{DT}$ | PORT # |

FIG. 7

| DT TERMINATION TABLE (IN THE RT) | |
|---|---|
| $ID_{DT}$ | DT LINK TERMINATION ON THE RT |
| ⋮ | ⋮ |
| ⋮ | ⋮ |
| DT370 | L365 |
| ⋮ | ⋮ |

FIG. 8

| RT TERMINATION TABLE (IN THE SWITCH) | |
|---|---|
| $ID_{DT}$ | RT LINK TERMINATION ON THE SW |
| ⋮ | ⋮ |
| ⋮ | ⋮ |
| DT370 | L345 |
| ⋮ | ⋮ |

FIG. 9

| TN-TO-$\widehat{OE}$ TABLE (IN THE SWITCH) | |
|---|---|
| $TN_i$ | $\widehat{OE}_i$ |
| ⋮ | ⋮ |
| ⋮ | ⋮ |
| 555-1234 | DT370-1 |
| ⋮ | ⋮ |

COMMUNICATIONS ACCESS NETWORK ROUTING

CROSS-REFERENCE TO RELATED APPLICATION

This is a continuation-in-part of United States patent application Ser. No. 08/033,477, filed Mar. 18. 1993, entitled "Communications Access Network Routing," now abandoned.

BACKGROUND OF THE INVENTION

The present invention relates to telecommunications systems and, in particular, to communications access networks including, for example, the telephone local loop plant.

The access network interconnecting, for example, a telephone central office and terminal equipment at customer premises locations is conventionally referred to as the "local loop plant." This network is comprised, for each connection or "local loop," of a series of local loop segments extending from within the central office through various cross-connection elements to endpoints connected to the customer premises locations. In strictly-wire-pair-based arrangements, these cross-connection elements typically include the main distributing frame within the central office building; one or more feeder/distribution interfaces (FDIs), typically housed in grade-level pedestal cabinets or huts, or in subterranean vaults; and a serving terminal, typically housed in an enclosure mounted on a utility pole, or on or within a building, and serving as the point from which extend wire "drop pairs," or "drops," serving perhaps a half-dozen customers. Administrative database systems such as those known as COSMOS, LIrACS and PREMIS are used by the local telephone companies to maintain detailed data for each local loop, specifying all of its wire pairs so that telephone craftpersons can, for example, a) identify which wire pairs between any two cross-connection elements are available for use as additional local loops are added, and b) troubleshoot reported local loop failures.

The process of provisioning new wire-pair-based local loops and performing maintenance on the existing local loops is an expensive one. The principal source of expense is the labor cost associated with the need for craftpersons to make manual cross-connections in the FDIs and serving terminals, along with the travel time. In turn, a major part of this labor cost arises out of the fact that a not-insignificant portion of the administrative database data is inaccurate, leading to mistakes and re-works in the course of a) provisioning new local loops, and b) deprovisioning of no-longer-needed, existing loops. The data inaccuracies can arise in many ways. For example, incorrect data may be reported from the field, as happens when the wire pairs used to establish local loop connections are mis-reported. Or, the data may be inaccurately entered by clerks to whom the craftpersons report the data. At some point, the overall level of inaccuracy in the databases becomes so great that the telephone company has little choice but to deploy a significant amount of resources to go out, survey the entire loop plant, and correct the data.

Over time, digital loop carrier (DLC) and fiber-in-the-loop (FITL) systems have begun to replace at least a portion of the wire-pair-based local loop plant. The most advanced of such systems can obviate some of the problems described above. For example, these systems feature active cross-connection elements whose cross-connections can be controlled and kept track of remotely, and automatically, from a central provisioning system. However, problems remain. For example, there still remains the need for a database to keep track of the cross-connections thus made. Additionally, the remote provisioning capability itself brings with it the need to administer an added infrastructure-most notably the data links by which the central provisioning system communicates with the DLC and/or FITL systems. Moreover, manual data entry is still required when, for example, the capabilities and/or capacities of the various access network elements are changed.

The invention set forth in our co-pending, commonly assigned U.S. patent application entitled, "Method and Apparatus for Establishing Connections in a Communications Access Network," Ser. No. 113,496 filed of even date herewith ameliorates the above-described problems. In accordance with that invention, cross-connections between the switching office and any particular endpoint are set up on a call-by-call basis to establish a connection based on information generated from within the access network itself based on information generated from within the access network There is thus avoided the prior art's need for a centralized loop assignment database/provisioning system to keep track of manually made cross-connections or to carry out centrally controlled cross-connection administration.

SUMMARY OF THE INVENTION

The present invention is directed to a technique that can advantageously be used to implement the invention set forth in our above-cited patent application. Specifically, communications between the switching office and a particular endpoint connected to the access network are provided in accordance with the invention, by routing an identification of that endpoint from the switching office through the access network via the use of previously stored routing information, that information identifying, at the switching office and at each of a plurality of packet switching elements within the access network, a particular downstream link over which the endpoint can ultimately be reached. In particular embodiments, each packet switching element is co-located with a cross-connection element in an access network node and the routing information stored therein is used to set up the connection, segment-by-segment, starting from the switching office. In other embodiments, in which the packet switching elements and the cross-connection elements need not be co-located, the routing information is used to packet-switch messages from the switching office to the particular endpoint. Responsive to receipt of such messages, the endpoint thereupon initiates the setting up of the connection through the cross-connection elements to carry the call-illustratively beginning from the endpoint itself and working its way back to the switching office.

In preferred embodiments, the aforementioned routing information is generated and stored automatically by having the cross-connection points report information about themselves upstream into the network, thereby allowing the network to "learn" its own topology. Such network "self-learning" is a general type of technique known, for example, in the data networking art but, to our knowledge, it has never been applied in the context of communications access networks to ameliorate the problems discussed above.

Although particularly useful as a way of establishing connections in an access network, the invention is not limited thereto. For example, the ability of the switching office to communicate messages to the access network endpoints could be used for other purposes, such as for endpoint administration and maintenance.

BRIEF DESCRIPTION OF THE DRAWING

FIGS. 7-9 show tables used to route signaling messages within the access network of FIG. 3.

DETAILED DESCRIPTION

Figure 1:
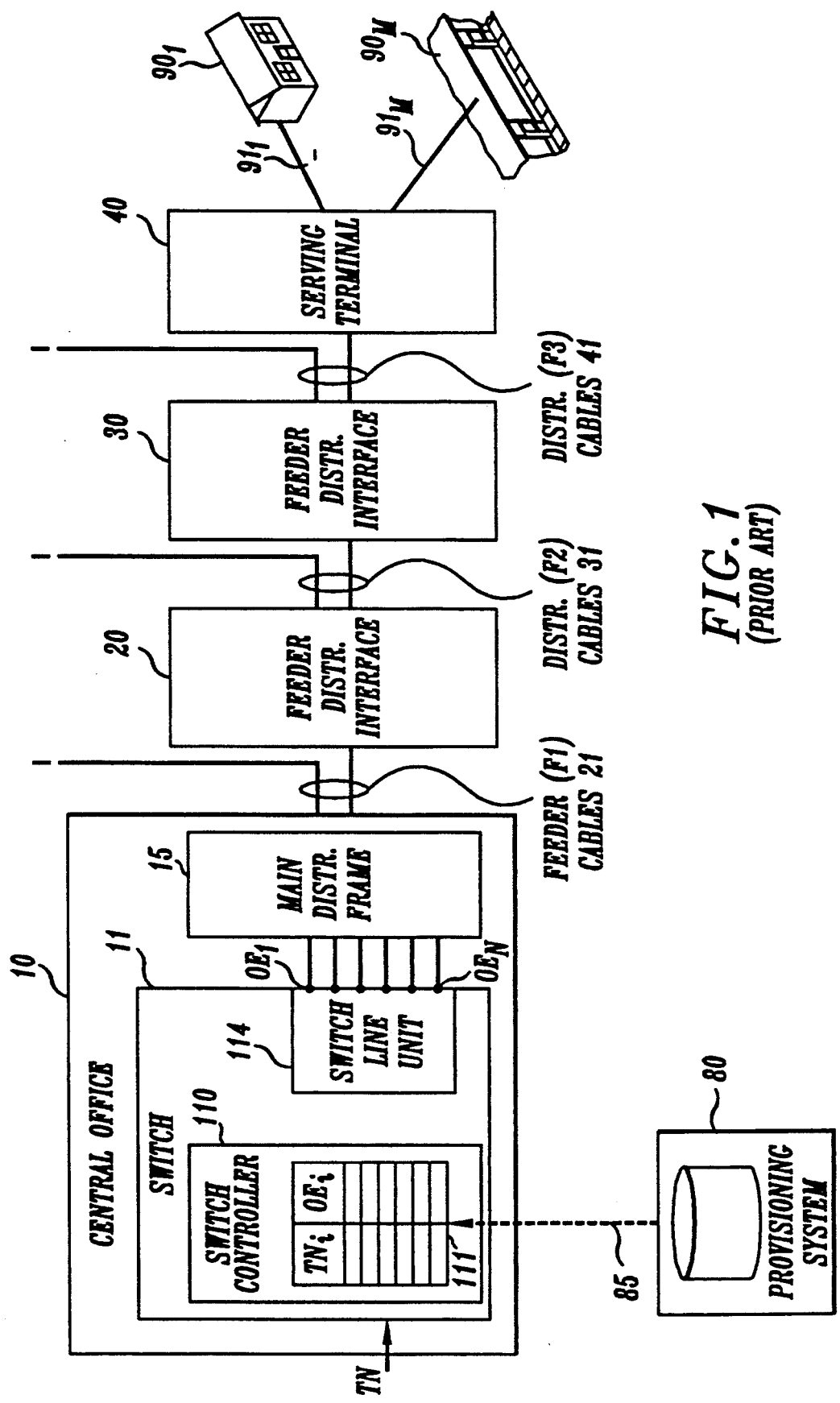
FIG. 1 shows a telecommunications system which includes a strictly wire-pair-based communications access network of a type known in the prior art-illustratively a local loop plant which interconnects a telephone central office with various telephone customer premises locations.

In the prior art arrangement of FIG. 1, a plurality of telephone customer premises locations $90_j$, $j=1...M$, are interconnected with a telephone central office 10 via a strictly wire-pair-based local loop plant. Telephone central office 10 includes, among its various components central office switch 11 and switch line unit 114. The latter includes switch termination points $OE_i, i=1...N$, each associated with a particular telephone number $TN_i$ served by that central office. The abbreviation "OE" is a standard telephony term meaning "originating equipment." Central office switch 11 includes a switch controller 110 which, in turn, includes a directory number translation table 111 that is administered from a central provisioning system 80 via a link 85. When a telephone call terminating on a particular $TN_i$ served by telephone central office 10 is received on an incoming trunk, such as trunk 8, switch controller 110 translates the $TN_i$ into the associated $OE_i$, using directory number translation table 111. The call is then connected to that $OE_i$.

Each switch termination point $OE_i$, in turn, is connected to an associated customer premises location $90_j$ via a local loop comprising a series of wire pairs extending from OE i through various access network nodes, or so-called cross-connection elements. These cross-connection elements include main distributing frame 15 within the central office building itself; one or more-in this case, two-feeder/distribution interfaces (FDIs) 20 and 30; and serving terminal 40, the latter being the terminating node. (In urban environments, a local loop may comprise a direct link from the main distributing frame to the serving terminal, with no intervening FDI.) The cables 21 containing wire pairs that connect n-rain distributing frame 15 directly to an FDI are conventionally referred to as feeder cables or F1 cables. The cables containing wire pairs that interconnect all subsequent cross-connection elements are conventionally referred to as distribution cables, with the distribution cables between each successive pair of cross-connection elements being called F2, F3 ... cables, respectively. Thus the particular one of cables 21 interconnecting main distributing frame 15 with FDI 20 is an F1 cable; the particular one of cables 31 interconnecting FDI 20 with FDI 30 is an F2 cable; and the particular one of cables 41 interconnecting FDI 30 with serving terminal 40 is an F3 cable. Wire pairs $91_j$ interconnecting serving terminal 40 with customer premises locations $90_j$ are conventionally referred to as "drop pairs" or, more simply, "drops," it being assumed in this example that each customer premises location is served by a single drop.

Not shown in the FIG. are numerous other FDIs and serving terminals which are interconnected back through to main distributing frame 15 in a conventional hierarchical arrangement via various ones of feeder cables 21 and distribution cables 31 and 41.

The local telephone company that operates central office 10 maintains detailed data specifying which wire pairs within the various cables, and which drop pairs, comprise any particular local loop. Typically, the local exchange carriers owned by the Regional Bell Olverating Companies (RBOCs) maintain this data in three administrative database systems, known as COSMOS, LFACS, and PREMIS. As shown in simplified form in FIG. 4, each of these database systems stores data for different segments of the local loops. The COSMOS system, in particular, maintains a record for that segment of each local loop which starts with the OE and terminates on the first FDI. The COSMOS record, more specifically, identifies the OE, the TN, and the F1 pair. The LFACS system maintains a record for that segment of the local loop which comprises the wire pairs in each of the feeder and distribution cables, and thus identifies the F1 pair, the F2 pair, etc. The PREMIS system maintains a record for the drop segment of each of the local loops that extends to a particular customer premises location. The PREMIS record, more specifically, identifies the street address of the customer premises location, the drop pair(s) associated with that location, the serving terminal from which the drop pairs extend, and the TN and OE associated with each drop pair. Additionally, the record in each of the databases further includes, as shown, a "condition" flag indicating the assignment status of the local loop segment in question, such as "assigned," "spare," or "faulty."

Although each local loop must have an associated record in each of the three databases, the opposite is not true. Many of the records in these databases are not associated with any currently provisioned local loop but, rather, exist as unassigned local loop segments. For example, when service to a particular customer premises location is turned out the records in the three databases associated with that local loop are not necessarily deleted. Rather, they may be marked as "spare." Thereafter any one or more of the local loop segments identified by those records, or portions thereof, may be assigned to new, subsequently provisioned local loops, while possibly leaving one or more of such segments or segment portions in the "spare" status. As alluded to earlier, it is often the case that records are created and updated in these databases in a less-than-meticulous and less-than-fully-regularized way, leading to the many database errors which make this approach to local loop administration a cumbersome and expensive one.

As noted above, digital loop carrier (DLC) and fiber-in-the-loop (FITL) systems have begun to replace at least a portion of the wire-pair-based local loop plant. Advantageously, the most advanced of such systems known in the art-which are only now starting to be deployed in the field-obviate many of the problems described above. For example, these systems feature active cross-connection elements whose cross-connections can be controlled and kept track of remotely from a central provisioning system.

Figure 2:
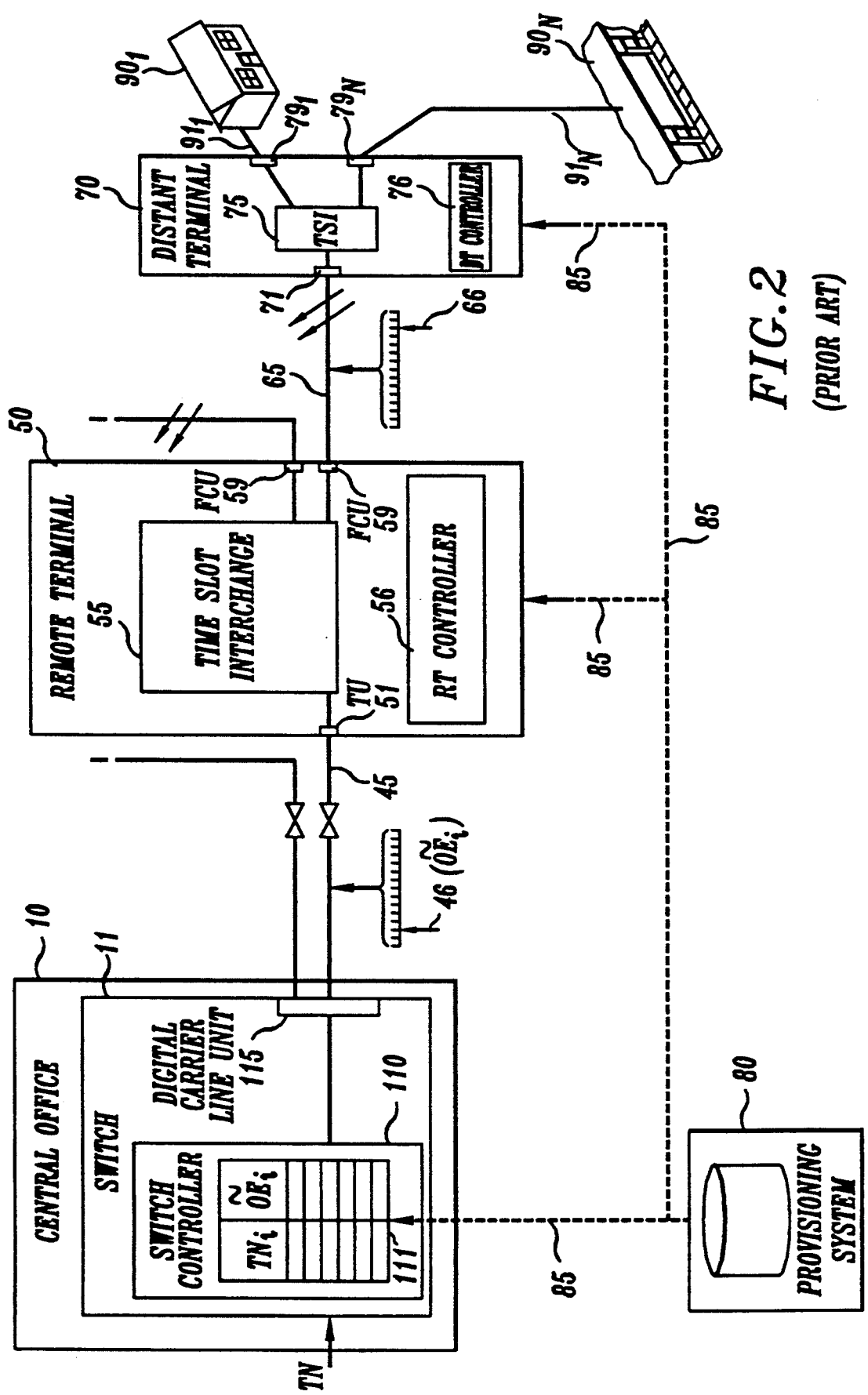
FIG. 2 shows telecommunications system which includes another prior art type of communications access network in which digital loop carrier (DLC) and fiber-in-the-loop (FITL) systems replace a major portion of the wire-pair infrastructure.

A local loop plant of this type is shown in FIG. 2. Again, the telephone customer premises locations $90_j$ are interconnected with a telephone central office 10, whose switch 11 has a switch controller 110 which, in turn, includes directory number translation table 111. The access network nodes are no longer wire-pair-based passive, e.g., mechanical, cross-connection elements, however, but rather are active cross-connection elements-referred to as remote tern-finals, or RTs, and distant terminals, or DTs, serving as the terminating nodes. The RTs and DTs are housed similarly to FDIs and serving terminals, respectively, as described above.

Specifically in FIG. 2, communications between the central office switch and a particular one of the RTs-illustratively, RT 50--are by way of a DLC system comprised of a digital carrier line unit (DCLU) 115 in the switch and RT 50, the latter including a trunk unit (TU) 51. These units are interconnected by time- division-multiplexed DLC link 45, illustratively comprised of five T1 lines. Communications between RT 50 and a particular one of the DTs-illustratively, DT 70-are by way of a FITL system comprised of fiber channel units 59 and 71 in the RT and DT, respectively, which are interconnected by time-division-multiplexed FITL link 65. The latter is illustratively comprised of a pair of loop distribution optical fibers. The drop pairs 91 j are defined herein as being single-channel links between DT 70 and the various customer premises locations. They are permanently connected to, and terminate within, DT 70 at line terminations, or "service ports," $79_j$, whose physical connection points to the drop pairs $91_j$ serve as local loop endpoints associated with DT 70 and served by the switch.

Not shown in FIG. 2 are numerous other RTs and DTs which are interconnected back through to DCLU I 15 in a conventional hierarchical arrangement via various DLC and FITI, links that are like links 45 and 65.

Systems of this type do not associate a physical switch termination point $OE_i$ with each $TN_i$ as in the arrangement of FIG. 1. Rather, there is associated with each $TN_i$ a particular timeslot on link 45, herein designated as timeslot $OE_i$. In this example, timeslot $OE_i$ is a particular timeslot that is selected for the TN i when the local loop is provisioned, and it does not change over time. Alternatively, in so-called "concentrating" DLC systems, each $OE_i$ represents a provisioned "virtual" timeslot which, on a call-by-call basis, is assigned to a timeslot by the DLC equipment and/or by switch 11. Once the $OE_i$ associated with a particular TN i for an incoming call has been obtained from directory number translation table 111, that call is extended to RT 50 in the particular assigned timeslot $OE_i$ illustratively indicated in FIG. 2 as timeslot 46. Timeslot 46 is herein referred to as a "feeder" timeslot inasmuch as link 45, on which that timeslot is carried, extends between the central office and the first external cross-connection point in the local loop plant.

Figures 4, 5, 6:
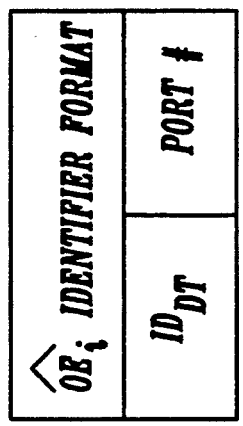
FIG. 4 shows, in simplified form, records maintained by prior art administrative database systems containing data about the communications access network of FIGS. 1 and 2.
FIG. 5 is a cross-connection table maintained within the remote terminal shown in the network of FIG. 2.
FIG. 6 shows the format of an access network endpoint identifier used within the access network of FIG. 3.

The local loop associated with the $TN_i$ and $OE_i$ in question is comprised, in a logical sense, of the aforementioned feeder timeslot 46 in combination with a particular "distribution" timeslot 66 carried on link 65 and with a particular one of service ports 79 $_j$ and its associated one of the drop pairs $91_j$. In order for the cross-connection between feeder timeslot 46 and distribution timeslot 66 to be effectuated, an entry must be provided in a cross-connection table within RT controller 56 of RT 50, that entry associating timeslots 46 and 66 with one another, i.e., "cross-connecting" them. This cross-connection table is shown in FIG. 5, with identifiers for timeslots 46 and 66 being symbolically represented as TS46 and TS66, respectively. The cross-connection is illustratively implemented by timeslot interchange 55 within RT 50 operating under the control of RT controller 56. Finally, a cross-connection table (not shown) within DT controller 76 of DT 70 associates timeslot 66 with the appropriate one of service ports 79j, enabling a timeslot interchange 75 within DT 70 to distribute calls carried in timeslot 66 to the appropriate drop pair.

It will be appreciated from the foregoing that the use of table-driven timeslot interchanges in the cross-connection elements takes the place of the manual operations of placing manual cross-connections in passive cross-connection elements as in FIG. 1. Indeed, the cross-connection tables in the RT and DT may be remotely administered, like table 111, from a central provisioning system 80 over signaling links 85 extending to every RT and DT in the local loop plant. The central administration of the cross-connection tables is advantageous in that many of the data errors that arise as a consequence of manual operations and human data entry are avoided. In particular, it is true, on the one hand, that current telephone company practice is to continue to make LFACS data entries in their present form-the only difference being that the data in the F1, F2 ... pair fields of the LFACS records refer to feeder and distribution timeslots rather than to wire pairs. On the other hand, however, since the LFACS records and cross-connection table entries are jointly administrable, synchronization between them, i.e., accuracy of the LFACS database, is guaranteed, at least in theory.

Problems remain, however. For example, there still remains the need for a loop assignment database to keep track of the cross-connections thus made. Additionally, the remote administration of the cross-connections brings with it the need to administer an added infrastructure-most notably signaling links 85. Moreover, manual data entry is still required when, for example, the capabilities and/or capacities of the RTs and DTs are changed, e.g., to add additional service ports to a DT by installing new service port cards.

Figure 3:
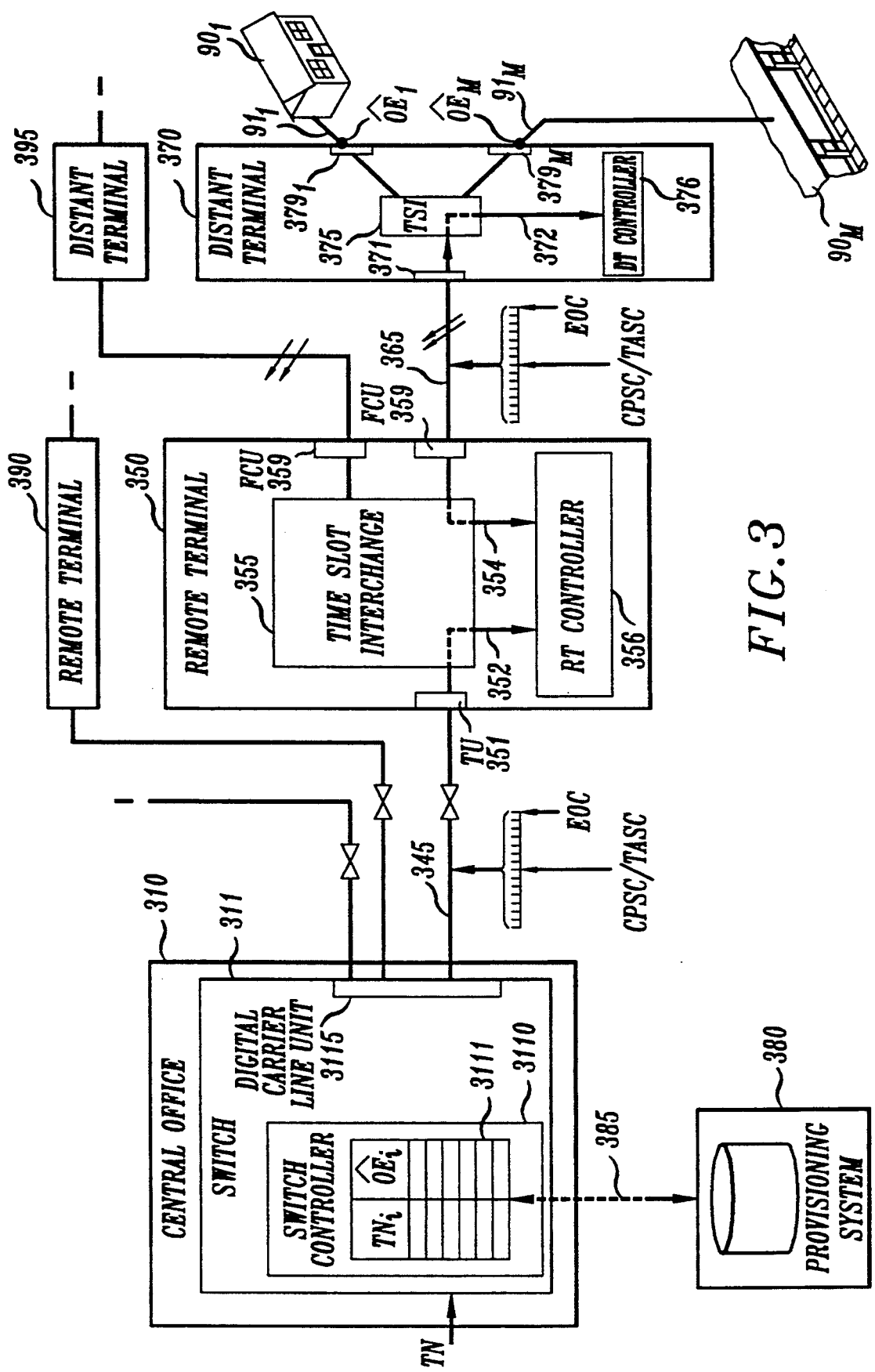
FIG. 3 shows a telecommunications system which includes a communications access network-again in the context of a local loop plant-embodying the principles of the present invention.

The above and other problems are ameliorated using the invention set forth in our above-cited co-pending patent application. In particular, a communications access arrangement-illustratively a telephone local loop plant-embodying the principles of that invention is shown in FIG. 3. This arrangement is similar to that shown in FIG. 2 except that in the hierarchy of access network nodes, including RTs 350 and 390 and DTs 370 and 395, various new capabilities are provided in, for example, the central office switch, the RTs and DTs, and the provisioning system.

In particular, cross-connections between switching office 310 and any particular one of the endpoints $OE_i$ served by the switch and associated with service ports $379_i$ of DT 370, i=1 . . . M, those ports serving as "downstream" ports for DT 370, are set up on a call-by-call basis to establish a connection between them based on information generated from within the access network itself. There is thus avoided the prior art's need for a centralized loop assignment database/provisioning system to keep track of manually n-rode cross-connections or to carry out centrally controlled cross-connection administration. Indeed, it may be noted in this regard that there are no links interconnecting provisioning system 380 with any of the RTs or DTs.

The setting up of a connection on a call-by-call basis as just described is advantageously carried out via the present invention. In accordance with the invention, more particularly, communications between telephone central office 310 and $OE_i$ are established by routing an identification of that endpoint through the access network via the use of previously stored routing information, that information identifying, at telephone central office 310 and at each of a plurality of packet switching elements within the access network, a particular downstream link over which the endpoint can ultimately be reached. The aforementioned packet switching elements are illustratively co-located with the cross-connection elements within the access network nodes, i.e., RT 350 and DT 370, themselves, and the routing information stored therein is used to packet switch messages from telephone central office 310 to DT 370. Responsive to receipt of such messages, DT 370 thereupon initiates the setting up of the connection through the cross-connection elements to carry the call in a manner to be described-illustratively beginning from service port $379_i$ itself and working its way back through DT 370 and RT 350 back to telephone central office 310.

The foregoing may be more fully understood by considering four basic scenarios: installation of DTs and RTs, customer service provisioning, and two call-placing scenarios-call termination and call origination.

We begin by considering the installation of a new DT-illustratively, DT 370-in the local loop plant. The process begins with the engineering of the installation of the DT by telephone company planners using a conventional engineering system (not shown). After the DT has been set in place, its identity and street address are entered into central provisioning system 380 from the engineering system. The physical link between DT 370 and its associated RT 350-illustratively FITL link 365-is then established.

In accordance with the invention, each DT in the local loop plant of FIG. 3 has implemented within it a capability that has been used in other contexts, that being the ability to report information about itself (self-report information) to an upstream entity-in this case the RT to which it is connected--so that, overall, the network is provided with the ability to "learn" its own topology. It is via this mechanism that the aforementioned routing information is generated and stored automatically in the access network, as is described in detail hereinbelow.

More particularly, the aforementioned reporting upstream by a DT occurs when the DT is first connected into the network. It also occurs whenever subsequent changes am made to a DT's configuration, e.g., the addition of a new service port card. Specifically, then, DT controller 376 within DT 370 reports to RT controller 356 within RT 350 when the DT is installed. The information originated from within DT 370 and reported to the RT includes, inter alia, an identification of the particular one of the terminating access network nodes in which it is included, i.e., DT 370 itself; its equipment configuration; its currently provisioned capabilities; and information about each of its service ports. The communication between DT controller 376 and RT controller 356 is carried out over a particular channel of link 365 which is set aside for the communication of administrative messages between the RT and DT. That channel-referred to as the "embedded operations channel" or EOC-is carried in a particular timeslot on link 365. As shown in the FIG., the EOC, and call processing signaling channel, or CPSC, and timeslot assignment signaling channel, or TASC, discussed below, are carded from DT controller 376 to RT controller 356 via signaling path 372, timeslot interchange (TSI) 375, link 365, timeslot interchange (TSI) 355 and signaling path 354.

The arrangement of FIG. 3 uses neither the notion of a switch termination point OE i nor of a timeslot $OE_i$ within the logical local loop. Rather, each telephone number $TN_i$ is associated directly with a local loop endpoint $OE_i$ which is the physical connection point of a particular one of the service ports of a particular DT to the associated drop pair. The representation of each local loop endpoint $OE_i$--the $OE_i$ identifier--illustratively has the format shown in FIG. 6. An initial portion of the Chit identifier identifies the DT of which it is a part, that portion being denominated $ID_{DT}$. The terminal portion of the $OE_i$ identifier is a port number which differentiates the various local loop endpoints $OE_i$ within a particular DT from one another. Upon receiving the $OE_i$ identifiers from DT 370, RT 350 adds entries to a DT termination table maintained within RT controller 356. As shown in FIG. 7, that table relates the $ID_{DT}$ of each DT to which RT 350 is connected to the link which extends from RT 350 to connect it to the DT in question, that link having been identified by RT 350 at the time that DT 370 first reported its presence to RT 350. Thus as shown explicitly in FIG. 7, this DT termination table includes an entry relating DT 370 to link 365, with identifiers for those two entities being symbolically represented as DT370 and L365, respectively.

Each RT has self-reporting capabilities similar to those described above for DTs. Thus at the time that RT 350 had been installed, a similar series of operations had been carried out, including the engineering of its installation; the entry of its identity and street address to provisioning system 380; the establishment of a physical link 345 between RT 350 and central office switch 311, that link being, as before, a T1 line group; and the reporting of similar self-report information upstream from RT controller 356 into central office switch 311 over the EOC which interconnects RT 350 and central office 310. In particular, the EOC, CPSC and TASC extend from FT controller 356 to switch 311 via signal path 372, timeslot interchange 355, and link 345.

The information reported by RT 350 to central office switch 311 at the time of the former's installation-and at subsequent times, as needed--includes an identification of itself; its equipment configuration; its currently provisioned capabilities; and information about that portion of the network which is downstream of the reporting RT. For present purposes, it suffices to focus on the latter information. Specifically, among the pieces of information reported from RT 350 to central office switch 311 are all of the (SE i identifiers from all of the DTs connected to RT 350, such as DT 370. Thus upon a) the installation of DT 370, b) its interconnection with RT 350, and c) its reporting of its $OE_i$ identifiers, all as described above, RT 350 reports those $OE_i$ identifiers from DT 370 all the way back upstream to central office switch 311. That latter, in turn, adds entries to an RT termination table maintained within switch controller 3110 of central office switch 311. As shown in FIG. 8, that table relates the ID DT of each $OE_i$ identifier reported to switch 311 to a feeder link and its associated EOC and CPSC/TASC extending from the switch which interconnects the switch with the RT in question. Thus as shown explicitly in FIG. 8, the RT termination table includes an entry relating DT 370 to link 345, identifiers for those two entities being symbolically represented as DT370 and L345, respectively. The information in the aforementioned tables thus identifies for each endpoint $OE_i$ a path, or route, through the access network from the switching office to the DT in which it is included.

Central office switch 311, in turn, reports all of the downstream $OE_i$ identifiers that are reported to it to central provisioning system 380. Advantageously, there is thus stored and ready in the provisioning system an identification of the service ports, and thus of the endpoints, of the newly installed DT 370.

Specifically, when a telephone subscriber speaks to a telephone company business office representative requesting service at some particular location, the representative accesses provisioning system 380 to assign a local loop endpoint $OE_i$ that already serves that street address. Failing this, the provisioning system assigns any available $OE_i$ in the DT nearest the street address. (Alternatively, $OE_i$ could be chosen by the craftperson installing the customer premises equipment, and entered into the system by the craftperson, either directly, or through the provisioning system.) Having identified an appropriate local loop endpoint $OE_i$, the representative assigns telephone number TNi to the subscriber using conventional procedures and enters a service order which a) describes the type of service(s) and features desired by the customer, b) associates $TN_i$ with the local loop endpoint $OE_i$, and c) if the $OE_i$ is newly assigned to the address in question, arranges for the connection of a drop from that endpoint to the customer premises. The provisioning system thereupon downloads the service and feature information, as well as the $TN_i$ and the $OE_i$ identifier, into central office switch 311 via link 85. The latter, in particular, is loaded into a directory number translation table 3111 shown both in FIG. 3 and in FIG. 9. The specific example shown in FIG. 9 is an entry mapping a particular $TN_i$, 555-1234, to service port #1 of DT 370, that service port having an $OE_i$ identifier symbolically represented as DT370-1.

Central office switch 311 is at this point, ready to provide service for calls to and from the provisioned telephone number. And, advantageously, that readiness to provide service has been provided without there having to have been a) any craftspersons deployed to any cross-connection points within the access network, nor b) any configuration of, or any information loaded into, any portion of the access network by any human operator or even by the provisioning system. Indeed, this approach renders unnecessary a need for either the COSMOS or the LFACS database systems or their equivalents, as well as any control links from the provisioning system to the RTs or DTs, and at the same time substantially eliminates the possibility of continued human error in the assignment process.

Looking at a typical call termination scenario, central office switch 311, upon receiving a call placed to telephone number 555-1234, finds from table 3111 the corresponding $OE_i$ identifier-in this case DT370-1. Using the ID DT portion of the $OE_i$ identifier-namely DT 370--the switch identifies link 345, from the table of FIG. 8, as being the appropriate link onto which it should place a signaling message indicating that an incoming call has been received for the local loop endpoint $OE_i$ identified as DT370-1. This and other call-processing-related messages are transmitted within a call processing signaling channel, or CPSC, that is carded within a particular timeslot on link 365, that timeslot also carrying the timeslot assignment signaling channel, or TASC discussed below.

The message frown central office switch 311 to RT 350 is thereupon packet switched within RT 350. That is, the endpoint identifier is used to determine how the message is to be forwarded on. In particular, RT controller 356 receives the CPSC via TSI 355 and, acting as a packet switching element, uses the $OE_i$ identifier DT370-1 to identify from its 5DT termination table (FIG. 7) that link 365 is the link on which messages destined for DT 370 should be placed on link 365. The message, more specifically, is transmitted out through TSI 355 onto the CPSC of link 365. The message to DT 370 is thereupon similarly packet switched within DT 370. In particular, DT controller 376 receives the CPSC via TSI 375 and, acting as a packet switching element, examines the the $OE_i$ identifier DT370-1 included in the message and determines that the message is destined, in this case, for service port $379_1$. The latter is thereby caused to extend a ringing signal over drop pair $91_1$, which is the drop pair connected to it.

It will thus be appreciated that the routing data of FIGS. 7-8 in the aggregate define individual signaling routes from central office 310 to each of the DTs and, thus, in practical effect to each of the service ports.

It will be observed that, at this point, there is no voice or other call connection between central office switch 311 and service port 379 1. At this point, however, the connection can now be set up. In particular, when the called subscriber answers the phone, service port $379_1$ detects the off-hook condition of the telephone set. DT 370 thereupon causes its fiber channel unit 371 serving as an "upstream" port of DT 370 to negotiate with one of fiber channel units 359 serving as "downstream" ports of RT 350 for the assignment of a timeslot on that link to service port 379 i, the negotiation being over the TASC on link 365. A segment of a virtual local loop connection has thus been established between the RT and the DT. Responsive to the initiation of the timeslot negotiation, trunk unit 351 in the RT serving as an "upstream" port thereof is controlled to similarly negotiate with digital carrier line unit 3115 within central office switch 311 for the assignment of a timeslot on link 345 to service port 379 i, thereby establishing a segment of the virtual local loop connection between the RT and the central office switch. An identification of the endpoint identified as DT 370-1 as having been the endpoint for which this call connection is being made is carried up to the switch as part of the timeslot negotiation procedure so that central office switch 311 is able to determine which of its endpoints is establishing a connection to it. Finally, a "make connection" message initiated by switch 311 and conveyed all the way down to DT 370 causes the assigned timeslots to be cross-connected by the cross-connection elements, i.e., TSI 355 and 375. A call connection between switch 311 and service port $379_1$ thus having been established on a call-by-call basis, the parties can begin to speak to one another. (The above-mentioned negotiation for timeslots, and the subsequent management and use thereof as the call progresses, and various possible error conditions and how they can be handled, may advantageously be substantially similar to analogous functionalities carried out in prior art "concentrating" DLC systems and FITL systems and thus need not be described in detail herein. Reference may be made in this regard, for example, to the portions of Bellcore Technical Reference TR-TSY-000008 and of Bellcore Technical Reference TR-NWT -000303 describing concentrating systems, those references being hereby incorporated by reference.)

We consider, now, a call origination scenario. Specifically, when a subscriber begins to place a call by going off hook, DT 370 addresses a signaling message to central office switch 311 over the CPSCs of links 365 and 345, requesting the provision of dial tone for a particular $OE_i$. (Since each network element has a well-defined signaling route upstream to the switch, the routing of this message can proceed straightforwardly in a conventional fashion.) Timeslots to carry the call are thereupon negotiated over the TASCs first between switch 311 and RT 350 and then between RT 350 and DT 370 in the manner described above, again establishing a connection on a call-by-call basis. The negotiated timeslots are thereupon interconnected and the switch supplies dial tone thereover. As the customer thereupon dials digits for the outgoing call, DT 370 forwards them over the CPSC to switch 311 which, in turn, processes the call in conventional manner.

Scenarios for tearing down the connections established as described above, as well as other call processing scenarios, such as the steps to be taken when the called telephone number is "busy," will be apparent and/or readily able to be devised by those skilled in the art and need not be described herein.

The foregoing is merely illustrative and many variations are possible. Some of those variations will now be described:

Although the illustrative embodiment includes only a single RT between the central office switch and the DT, it will be appreciated that, in analogy to the arrangement shown in FIG. 1, there may be any desired number of RTs between the switch and the DT, each such RT having an appropriate routing table similar to those shown in FIGS. 7 and 8.

In the illustrative embodiment, the packet switching elements via which messages are routed are co-located with the cross-connection elements within respective access network nodes. In other embodiments, however, a totally separate packet switching network, with its own separate access network nodes (wherein the routing information would be stored) and its own set of links within the access network, could be used.

In yet other embodiments, the routing information may be contained within the same access network nodes that contain the cross-connection elements, as in the disclosed embodiment, but the routing information is used to set up the connections segment-by-segment directly, starting from the switching office. In such other embodiments, specifically, the switch uses its routing table to identify an appropriate downstream link over which it should communicate with a downstream RT to negotiate a timeslot to set up a first segment of the connection to be established. Using either inband signaling over the channel thus established or out- of-band signaling over the CPSC, the switch forwards the $OE_i$ identifier over the RT in question. The latter then a) uses its routing table to identify an appropriate downstream link over which it should communicate with a downstream RT or DT to negotiate a timeslot to set up a second segment of the connection to be established, and b) then cross-connects its incoming and outgoing timeslots. This process is repeated until a complete connection to the endpoint has been established. Note that, here again, cross-connections between the switching office and any particular endpoint are set up on a call-by-call basis to establish a connection.

The TN to OE translation function may be distributed among the RTs and/or DTs in the access network. In this configuration, a) the initial downstream incoming call signaling from the switch to the RTs and DTs is broadcast downstream to RTs and/or DTs, and b) individual ones of RTs and/or DTs contain information similar to that of FIG. 9 which maps a TN to a particular endpoint. From this point on, the signaling proceeds in a manner similar to that described above.

The setting up the cross-connections on a call-by-call basis as described herein is not limited to so-called "switched services" wherein calls of relatively short duration are the norm. Rather, it is equally applicable to calls of extremely long duration, effectively implementing the equivalent of a so-called "special services" circuit.

Various transmission elements could be added to either the switch-to-RT or RT-to-DT links. An example would be to provide an access network where the group of five T1 lines are themselves multiplexed together and routed over a SONET ring of higher bandwidth. The characteristic aspect of such arrangements is that the intervening transmission elements do not perform DSO-level re-arrangement, nor do they participate in the signaling and DSO bandwidth assignment functions that are characteristic of the access network nodes described herein.

The present illustrative embodiment shows a single RT between the switch and the DT. It will be appreciated that the path between the switch and the DT can include any desired nutabet of RTs, including none, meaning that it is possible to link n DT directly to the switch. Moreover, it is possible for some subscriber premises to be connected directly to an RT while that same RT is connected to other subscriber premises DTs, per the illustrative embodiment.

A network element could be multiply connected to two or more access network nodes that are upstrench of it, rather than just one, as shown herein. Such an approach creates multiple message routes and also multiple connection paths between the switch and the DT. Any of a number of commonly known selection criteria can be used to select the paths used for (a) the EOC, (b) the CPSC/TASC, and (c) connections between each pair of access network nodes. Given the selection of a particular path for the EOC and CPSC/TASC, assignment and connection operations similar to those described above may be performed.

In the present illustrative embodiment, the "channels" and "timeslots" are presumed to be fixed-bit-rate entities. In other embodiments, however, they could be variable-bit-rate entities.

The above discussion presents the channel negotiation process-by which the various channels between the switch and the $OE_i$ are dynamically assigned-as one in which the channels are assigned within each successive link in serial fashion. Those skilled in the art will appreciate, however, that many different negotiation processes could be developed, including processes that perform several of the described operations concurrently, thereby providing lower call set-up times.

Additional variations involve more complex service and customer premises equipment (CPE) arrangements. For example, multiple TNs could be associated with a single $OE_i$, thereby facilitating the implementation of so-called "teenage" lines and "party" lines. Also, so-called "intelligent" CPE can be designed to report their TNs upstream within the access network in a manner similar to that used in present-day cellular telephone networks. Upon receipt of such a TN report, the access network can dynamically reassign the TN of the CPE to the local $OE_i$ where the user is then located, thereby allowing a subscriber to receive calls placed to his/her phone number wherever he/she happens to be at the moment.

A simplified RT design is possible wherein the RT does not have any message routing responsibility. Rather, this responsibility is assumed by the switch. In this variation, an RT is transparent to the EOCs and CPSCFFASCs passing through it between DTs and the switch. To accommodate such an approach, the switch would be arranged to associate all subtending DTs with their respective RT(s), even though they do not share a common EOC between the RT and the switch. Connections are then established by issuing setup requests to the RT over its TASC and to the DT over its own TASC. This can be seen to be logically equivalent to the illustrative embodiment described.

The links interconnecting the various network access nodes are disclosed here as being time-division-multiplexed links. Those links, however, could, alternatively, be links which support packet or cell multiplexing techniques, in which instance each "channel" is defined by a virtual channel identifier. More particularly, these links could be links which support the so-called asynchronous transfer mode, or ATM.

It will thus be appreciated that those skilled in the art will be able to devise numerous arrangements which, although not explicitly shown or described herein, embody the principles of the invention and are thus within its spirit and scope.

We claim:

1. Apparatus for use in a local loop access network to provide communications between a telephone central office switch and individual distant terminals each associated with a respective plurality of endpoints served by said switch, said apparatus comprising
   a plurality of remote terminals,
   a plurality of links interconnecting said switch with said distant terminals via said remote terminals, and
   packet switching means in each of said remote terminals for packet switching messages relating to said endpoints from said switch to those endpoints associated distant terminals via said links,
   said switch being one which receives dial tone requests from the endpoints that it serves and, in response, provides dial tone thereto, and further being one which causes ringing signals to be extended to the endpoints that it serves in response to the receipt of telephone calls that are delivered to said switch and are intended for said endpoints.

2. Apparatus for use in a local loop access network to provide communications between a telephone central office switch and individual distant terminals each associated with a respective plurality of endpoints served by said switch, said apparatus
   a plurality of remote terminals,
   a plurality of links interconnecting said switch with said distant terminals via said remote terminals,
   means for storing routing information identifying for each of a plurality of said distant terminals a respective one of said links which extends from said each remote terminal and connects to said each distant terminal through said access network, and
   packet switching means in each of said remote terminals for packet switching messages relating to said endpoints from said switch to those endpoints' associated distant terminals via said links by receiving from a first one of said links a message which includes an identifier of a particular one of said endpoints and its associated distant terminal recovering said identifier from said message, using said identifier to identify from the routing information stored in said first remote terminal a second link which connects to said particular one of said distant terminals, and transmitting over said second link a message which includes at least said endpoint identifier.

3. The invention of claim 2 further comprising means in said switch for storing routing information identifying for each of said endpoints a respective one of said links which extends from said switch and connects to the distant terminal associated with said each endpoint through said access network.

4. The invention of claim 2 wherein each of said distant terminals includes means operative in response to receipt from an individual one of said links of messages which include identifiers of its associated endpoints for initiating the establishment of telecommunications connections between said switch and those endpoints.

5. The invention of claim 4 wherein each of said remote terminals includes cross-connection means for interconnecting channels carried on ones of said links to establish said telecommunications connections.

6. A network for interconnecting a communications switching office with customer premises served by said communications switching office, said network comprising
   a plurality of network nodes, individual ones of said network nodes having ports connected to said customer premises,
   a plurality of links interconnecting said network nodes and said communications switching office, and
   means for storing dam in said communications switching office and said network nodes, said dam, the aggregate, defining individual signaling routes from said communications switching office to each of said ports, said data being created in response to information about how said nodes are interconnected, said information being generated by at least ones of the network nodes, wherein signaling within said individual signaling routes goes downstream from said communications switching office and upstream towards said communications switching office and wherein each of said ones of the network nodes is adapted to provide information about itself to a network node upstream of itself or to said communications switching office.

7. The invention of claim 6 further comprising means in said communications switching office and in said network nodes for establishing telecommunications connections between said communications switching office and each of said porks in response to messages communicated over the signaling route between said communications switching office and [that port.]said each of said ports.

8. The invention of claim 6 wherein said generated information includes an identification of each of said individual network nodes and, for each of same, an identification of each of the ports included therein; and wherein such information is provided to, and stored in, a provisioning system associated with said network.

9. The invention of claim 8 wherein said provided information is provided from said network to said provisioning system via said communications switching office.

10. The invention of claim 9 further comprising means in said communications switching office and said network nodes for establishing connections between said communications switching office and an individual one of said ports in response to messages communicated over the signaling route between said communications switching office and that port.

11. The invention of claim 6 wherein said information that is provided from said individual ones of said network nodes includes each of the ports of those network nodes.

12. The invention of claim 11 further comprising means in said communications switching office and said network nodes for establishing connections between said communications switching office and an individual one of said ports in response to messages communicated over the signaling route between said communications switching office and that port.

13. The invention of claim 6 wherein the information provided by at least one of said network nodes about itself includes at least the identification of ports included in network nodes which are downstream of it.

14. The invention of claim 13 further comprising means in said communications switching office and said network nodes for establishing connections between said communications switching office and an individual one of said ports in response to messages communicated over the signaling route between said communications switching office and that port.

15. The invention of claim 14 wherein said communications switching office is a telephone central office and wherein a portion of said data is data stored in said telephone central office which maps telephone numbers serving respective ones of said customer premises with the ports to which the customer premises are connected.

16. The invention of claim 15 wherein said generated information includes an identification of each of said individual network nodes and, for each of same, an identification of each of the ports included therein; wherein such information is provided to and stored in a provisioning system associated with said network; and wherein said provisioning system includes means for providing service to a particular customer premises by identifying an individual one of the port identifications stored in the provisioning system that is not currently serving a customer premises and adding to said central office data an entry mapping to that port a telephone number assigned to that customer premises.

17. The invention of claim 15 wherein said central office data further maps each of said telephone numbers to respective link connecting said communications switching office to an individual downstream network node and wherein, in response to receipt of a telephone call destined for a particular telephone number, said telephone central office initiates downstream signaling over the respective link, said signaling including an identification of the port to which said telephone number is mapped.

18. The invention of claim 15 wherein said central office data further maps each of said ports to a respective link connecting said communications switching office to an individual downstream network node and wherein, in response to receipt of an upstream message requesting service for a particular one of said ports, said communications switching office initiates downstream signaling over the respective link, said signaling including an identification of the port to which said telephone number is mapped.

19. The invention of claim 14 wherein a portion of said data is data stored in at least a first one of the network nodes, that data mapping identifications of downstream nodes to associated downstream links, and wherein, in response to receipt of signaling directed to said one network node from upstream in said network in which signaling a particular one of said downstream nodes and a particular one of said ports is identified, said one network node directs further signaling over the link associated with said identified downstream node, said further signaling including at least an identification of said identified port.

20. Apparatus for use in a local loop access network to provide communications between a telephone central office switch and individual distant terminals each associated with a respective plurality of endpoints served by said switch, said apparatus comprising
a plurality of remote terminals,
a plurality of links interconnecting said switch with said distant terminals via said remote terminals,
means for storing routing information identifying for each of a plurality of said distant terminals a respective one of said links which extends from said each remote terminal and connects to said each distant terminal through said access network, and
packet switching means in each of said remote terminals for packet switching messages relating to said endpoints from said switch to those endpoints' associated distant terminals via said links by receiving from a first one of said links a message which includes an identifier of a particular one of said endpoints and its associated distant terminal, recovering said identifier from said message, using said identifier to identify from the routing information stored in said first remote terminal a second link which connects to said particular one of said distant terminals, and transmitting over said second link a message which includes at least said endpoint identifier,
said switch being one which receives dial tone requests from the endpoints that it serves and, in response, provides dial tone thereto, and further being one which causes ringing signals to be extended to the endpoints that it serves in response to the receipt of telephone calls that are delivered to said switch and are intended for said endpoints, 21. The invention of claim 20 further comprising means in said switch for storing routing information identifying for each of said endpoints a respective one of said links which extends from said switch and connects to the distant terminal associated with said each endpoint through said access network.

22. The invention of claim 21 wherein said routing information stored in said switch and in said remote terminals is generated in response to information about the topology of said access network, said topology information being generated from within said access network and reported through said remote terminals to said switching office.

23. The invention of claim 22 wherein each of said distant terminals includes means operative in response to receipt from an individual one of said links of messages which include identifiers of its associated endpoints for initiating the establishment of telecommunications connections between said switch and those endpoints.

24. The invention of claim 23 wherein each of said remote terminals includes cross-connection means for interconnecting channels carried on ones of said links to establish said telecommunications connections.

* * * * *